United States Patent
Cornelius (10) Patent No.: US 6,439,646 B1
(45) Date of Patent: Aug. 27, 2002

(54) SOFT SHELL CAMPER TOP INCLUDING A ROOF RACK FOR USE ON A PICKUP TRUCK

(76) Inventor: Charles S. Cornelius, 769 N. Michigan Ave., Pasadena, CA (US) 91104

( * ) Notice: Subject to any disclaimer, the term of this patent is extended or adjusted under 35 U.S.C. 154(b) by 0 days.

(21) Appl. No.: 09/694,804

(22) Filed: Oct. 23, 2000

(51) Int. Cl.[7] .................................................. B60P 3/373
(52) U.S. Cl. .............. 296/164; 296/26.04; 296/100.18; 296/105; 296/141; 224/309; 224/319; 224/324
(58) Field of Search .................................. 224/309, 319, 224/324, 924; 296/26.04, 100.17, 100.18, 102, 104, 105, 138, 140, 141, 143, 145, 163, 164, 167

(56) References Cited

U.S. PATENT DOCUMENTS

| | | | | |
|---|---|---|---|---|
| 160,792 A | * | 3/1875 | Saunders | 296/104 |
| 481,715 A | * | 8/1892 | Lightford | 105/115 |
| 510,330 A | * | 12/1893 | Davis | 296/104 |
| 741,367 A | * | 10/1903 | Parish | 296/104 |
| 3,354,891 A | * | 11/1967 | Brown | 135/88.09 |
| 3,936,077 A | * | 2/1976 | Bliek | 280/423.1 |
| 4,063,762 A | * | 12/1977 | Williams | 296/167 |
| 4,146,198 A | * | 3/1979 | Bott | 224/324 |
| 4,285,539 A | * | 8/1981 | Cole | 296/105 |
| 4,378,127 A | * | 3/1983 | Rossi, Sr. | 296/3 |
| 4,709,956 A | * | 12/1987 | Bowman | 296/100.18 |
| 4,932,717 A | * | 6/1990 | Swann | 296/100.09 |
| 5,056,855 A | * | 10/1991 | Moravsky | 296/98 |
| 5,238,288 A | * | 8/1993 | Chandler | 296/100.18 |
| 5,788,317 A | * | 8/1998 | Nation | 296/141 |
| 5,951,092 A | * | 9/1999 | Cissell | 296/100.12 |
| 5,988,472 A | * | 11/1999 | McPhail et al. | 224/403 |
| 6,135,686 A | * | 10/2000 | Chasen | 410/120 |

* cited by examiner

Primary Examiner—Joseph D. Pape
Assistant Examiner—Lori L Coletta
(74) Attorney, Agent, or Firm—Christie, Parker & Hale, LLP

(57) ABSTRACT

A soft shell camper top for use on pickup truck cargo compartments is disclosed. The invention consists of a space frame and a flexible outer covering. The frame is removably attachable to the pickup truck bed and includes provisions for the attachment of a roof rack. The outer covering includes front and rear curtains and side curtains. The curtains may be securely fixed to attachments on the frame to protect cargo from the elements or may be rolled up to facilitate easy access to the truck bed.

51 Claims, 9 Drawing Sheets

SOFT SHELL CAMPER TOP INCLUDING A ROOF RACK FOR USE ON A PICKUP TRUCK

BACKGROUND OF THE INVENTION

This invention relates generally to removable camper shell tops for use with pickup trucks, and is more particularly concerned with a removably attachable soft shell top which includes provisions for attaching a roof rack.

The popularity of camper tops for pickup truck is well known. They are used to convert the bed of the pickup truck into a sizable enclosed space. With a camper top, a pickup may be used as a recreational vehicle or may simply be used as an enclosed truck for protecting cargo from the elements.

A camper top for a pickup is advantageous in that it may be removed so that the truck serves a dual purpose. Without the top, the truck may be used as an open-bed pickup. With the top, the truck is converted into an enclosed camper. However, the construction of known camper tops tends to thwart this advantage, because typical hard shell camper tops tend to be heavy and awkward and therefore not easy to remove or install. Thus, the owners of camper tops are often discouraged from removing them once installed, except in the most urgent need.

Various camper top constructions have been devised in an attempt to circumvent this disadvantage. U.S. Pat. No. 4,815,786 to McRay, for example, discloses a collapsible camper top with telescoping metal side walls that collapses into a stored configuration in the bed of the pickup permitting the pickup bed to be used while the collapsed camper top is stored there. Unfortunately, the collapsed McRay top occupies a substantial portion of the available cargo space in the bed.

In attempts to circumvent the above-noted disadvantage, camper tops have been devised that are formed of a light weight fabric or plastic covering that is installed over a removable or collapsible frame on a pickup truck body. An example of this type of camper top is found in U.S. Pat. No. 4,813,734 to Hoover. Hoover discloses a frame consisting of interconnected sections of PVC pipe, where the frame rests in the pickup bed and is covered by a tarp laced to the frame by lengths of cord. While Hoover does provide a lightweight soft shell camper top, the PVC frame is not securely attached to the pickup bed and is incapable of supporting structural loads placed on the frame by, for example, a roof rack. Further, the tarp-covering is fixed to the PVC frame in such a manner that convenient access to the pickup truck bed is precluded.

The problems of soft shell camper tops for pickups are heightened when it is desired to equip the top with a roof rack, a feature in great demand by consumers. Roof racks are typically used by consumers to carry oversized and/or awkward loads such as bicycles, skis, camping gear, and other recreational equipment. Prior art soft shell tops may not have sufficient strength to support such loads which are typically on the order of 200–300 pounds. It is not presently believed that any prior art soft shell tops include provisions for a roof rack.

What is needed therefore is a soft shell camper top that is securely, yet removably, attachable to a pickup truck bed. Such a top should be equipped with features that allow for easy loading and unloading of gear or cargo from the sides of the pickup bed. Such a top should include provisions for attaching a roof rack and should have sufficient structural strength to support loads of at least 200–300 pounds in order to safely handle the weight of typical recreational equipment.

SUMMARY OF THE INVENTION

The present invention provides a soft shell camper top for a pickup truck that includes provisions for a roof rack and is capable of safely supporting the weight of the recreational equipment typically transported on roof racks. The soft shell top may be quickly and easily attached to, and removed from, a pickup truck bed. The top additionally includes innovative side panels and other features which allow for side access to the truck bed and for easy loading and unloading of cargo carried in the truck bed.

The soft shell camper top of the present invention includes a space frame, and a flexible outer covering. The camper top may optionally be equipped with a roof rack. The frame may be rigidly attached to the upper rails of a pickup truck bed and is preferably formed from stainless or powder coated steel. The frame includes a pair of longitudinal side rails which may be bolted or clamped to the truck bed. The frame also includes a plurality of lateral hoop members which closely conform to the shape of the pickup truck cab and which support the flexible covering. The hoop members laterally span the truck bed attaching to each opposing frame side rail. The frame further includes a plurality of longitudinal spreader bars. The spreader bars have provisions for mounting a roof rack and may be arranged in a variety of configurations to position the roof rack at different locations over the soft shell top. The optional roof rack is designed to be removably attachable to the spreader bars. The roof rack may carry typical recreational equipment and is preferably formed from steel.

The outer covering is flexible and foldable and shaped to fit over the space frame and to be secured in position so as to define a sizable functional enclosed camper space. The covering may be formed from any suitable material, but is preferably formed from a woven fabric of synthetic fibers. The frame and covering are formed to provide an aerodynamically desirable profile which permits the vehicle to be driven comfortably at typical freeway speeds with the camper top installed.

Other features and advantages of the invention will become more apparent from the following detailed description of the invention, when taken in conjunction with the accompanying exemplary drawings.

DETAILED DESCRIPTION OF THE PREFERRED EMBODIMENTS

Figure 1:
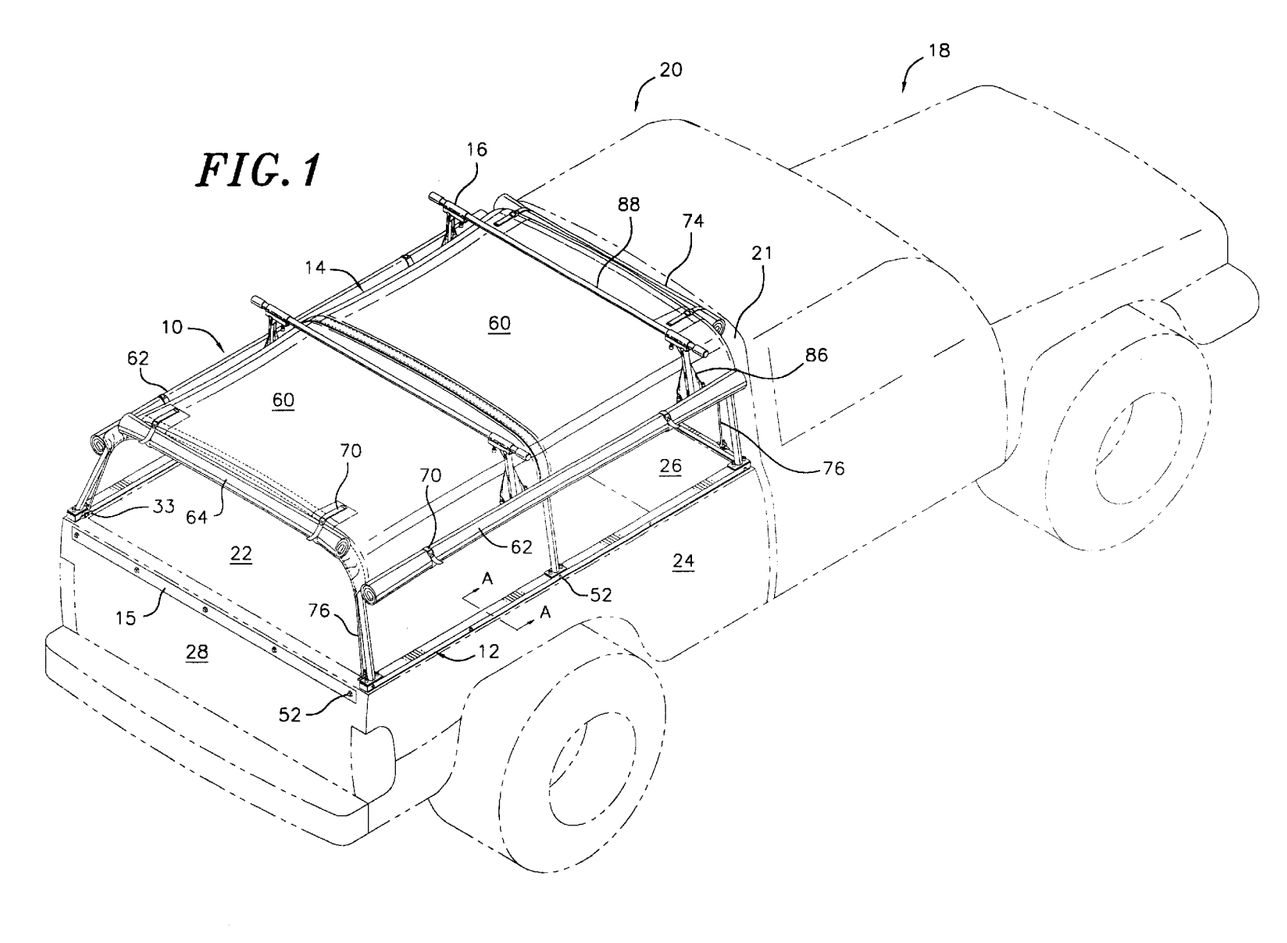
FIG. 1 is a perspective view of a typical pickup truck with the soft shell camper top of the present invention situated thereon.

Referring to FIG. 1, there is shown a soft shell camper top 10 in accordance with the present invention. The camper top includes generally a frame 12, an outer cover 14, a tailgate strip 15, and optionally a roof rack 16. The camper top is shown mounted on a typical pickup truck 18. The truck includes, a cab 20, a cab back wall 21, a bed 22, side walls 24, a front wall 26, and a tailgate 28.

Figure 2:
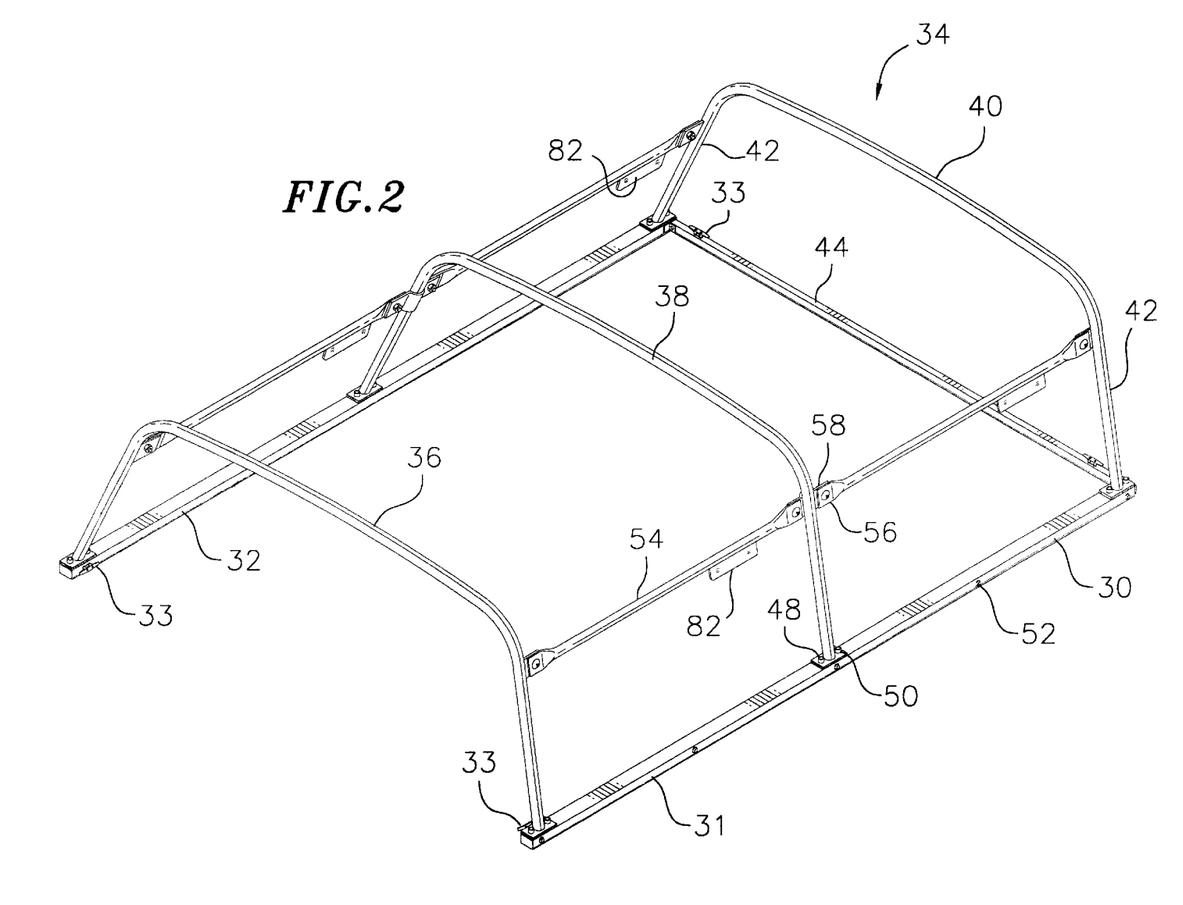
FIG. 2 is a perspective view of a frame for a soft shell camper top in accordance with the present invention.
Figure 3:
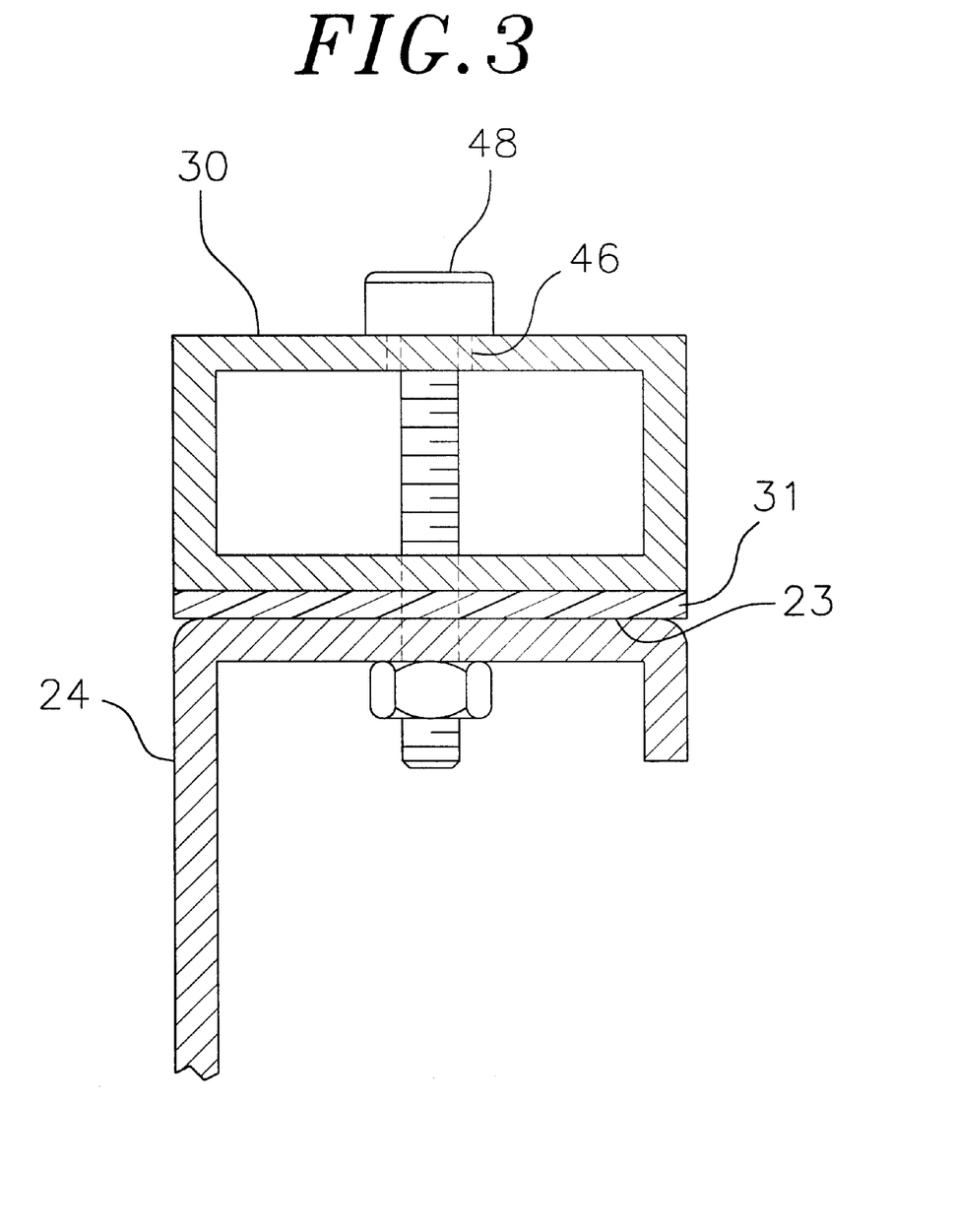
FIG. 3 is a section view, taken along the line a—a, of the frame shown in FIG. 1.

Referring now to FIGS. 2 and 3, the frame 12 is illustrated in greater detail. The frame includes a first elongate longitudinal rail member 30 and a second elongate longitudinal rail member 32, which are preferably rectangular in transverse cross section. The longitudinal rails are designed to conform to, and rest on, the top faces of the pickup truck side panels 24. Attached to the bottom surface of the rails (that surface adjacent the top surface of pickup truck side panels) is a layer of non-marring material 31. The layer of non-marring material 31 prevents damage to the truck's paint which would otherwise result due to abrasion between the rails and the truck sides. The non-marring material layer is preferably composed of high density closed cell foam. Numerous other polymer materials such as polyurethane, polyethylene, and polyamide in foam or sheet form, as well as rubber are also suitable. The non-marring material layer may be attached to the longitudinal rails by adhesive bonding and other suitable techniques.

Disposed adjacent the rear or tailgate end of the longitudinal rails are rear anchors 33 which in combination with a set of front anchors provide tie-off points for snugly securing the outer cover 14 about the frame. Spaced along the sides of the rails are snaps 52 which also serve to secure the cover. The snaps are merely illustrative of one method of securing the outer cover along of the sides of the rails. Any other attachment means or combination of attachment means are suitable for securing the cover to the frame rails. Other suitable methods of attachment include hook and loop attachments used either alone or in combination with snaps.

Referring now to FIG. 3, the longitudinal rails 30 and 32 are securely attached to the side panels 24 of the pickup truck. The rails may be bolted, clamped, or otherwise attached to the truck side panels. Preferably, the rails are equipped with clearance holes 46 which pass through the rails and mate with corresponding holes formed in a top surface 23 of the truck bed side panel 24. Through-bolts 48 which pass through the clearance holes are used to attach the rails to the truck side panels, as is shown in FIG. 3. Those skilled in the art will understand that appropriate nuts and washers are to be used in conjunction with the through-bolts. For short bed pickups two through-bolts per side are preferred. For long bed pickups three through-bolts per side are preferred. The arrangement shown in FIG. 3 is meant to be exemplary only. Other fastening arrangements are suitable and known in the art.

Figure 9:
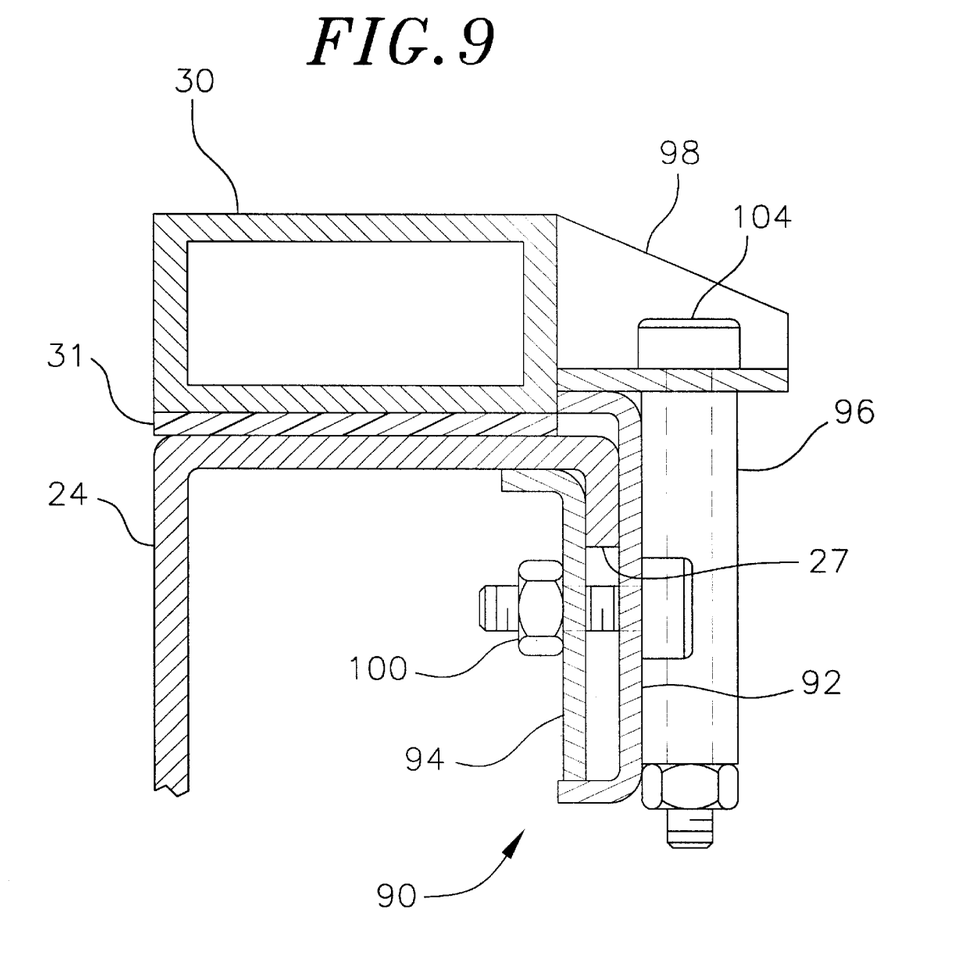
FIG. 9 depicts alternative attachment hardware utilizing clamps for attaching the frame of FIG. 2 to the pickup truck.
Figure 10:
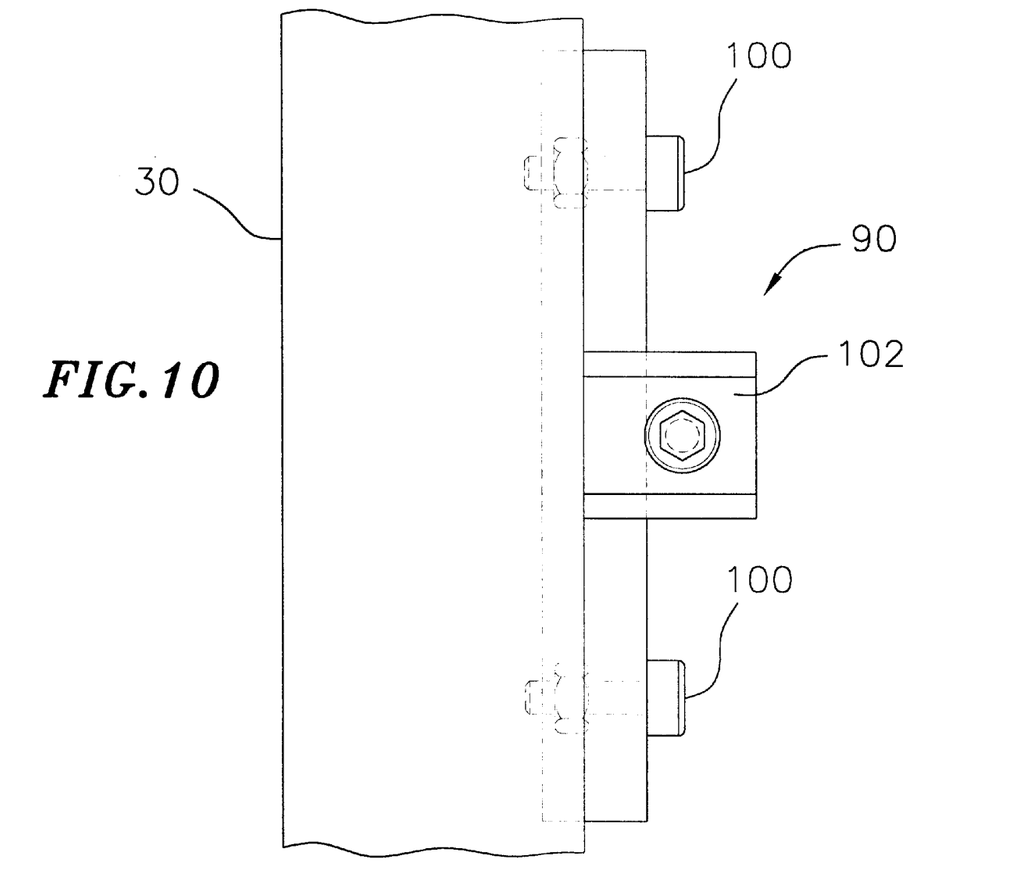
FIG. 10 is a top view of the attachment hardware shown in FIG. 9.

Referring now to FIGS. 9 and 10, a method for clamping the longitudinal rails to a truck bed side panel 24 is shown. In this approach a clamp 90 is attached to a lip 27 of the pickup truck side panel 24. The clamp comprises an inner clamp plate 94 and an outer clamp plate 92. Attached to the outer clamp plate is a cylindrical member 96. One or more clamp bolts 100 are used to clamp the inner and outer clamp plates to the truck bed lip 27. In applications where clamping is used as the method of attaching the longitudinal rails to the pickup truck bed, the rails are equipped with fittings 98. Each fitting includes a clearance hole 102 which interfaces with the cylindrical member 96 of the outer clamp plate. The longitudinal rails are attached to the clamps by means of a through-bolt 104 which passes through the clearance hole 102 and the cylindrical member 96 of the outer clamp plate. Although, the through bolt 104 is illustrated in the exemplary embodiment, those skilled in the art will realize that pins such as ball-lock pins may be used in place of the through-bolt. The method and hardware described above for clamping the longitudinal rails to the truck bed is provided for situations where it may be undesirable to drill mounting holes in the truck bed.

Attached to the opposing longitudinal rail members 30 and 32, and laterally spanning the pickup truck bed 22, are front and rear hoop members 34 and 36 respectively. Between the front and rear hoop members is at least one intermediate hoop member 38. Each hoop member includes two generally inwardly sloping upright portions 42, which are interconnected by a horizontal portion 40. The hoop members 34–38 are preferably formed from circular tubing, the ends of which terminate in weldments 50. The weldments 50 provide for connection of the hoop members to the longitudinal rails. Preferably the weldments and the longitudinal rails are match drilled to allow for bolted connections between the hoop members and the rail members.

In order to maintain a desirable aerodynamic profile, the hoop members generally conform to the outline of the cab back wall 21. Generally, to prevent undue vibration at typical freeway speeds (60–70 mph), the horizontal portion 40 of the hoop members should be within a range of about one inch above or below the horizontal plane defined by the top of the pickup truck cab 20. In addition, the generally vertical portions 42 of the hoop members should be limited in inward or outward extent to about one inch with respect to the generally vertical portions of the cab back wall.

Attached between each adjacent hoop member, is at least one spreader bar 54. The spreader bars are preferably of circular cross-section with flanged ends 56 which mate with weldments 58 disposed near the top of the vertical portions 42 of the hoop members. The flanged ends of the spreader bars and the weldments 58 are preferably drilled with clearance holes to allow for bolted connections between the hoop members and the spreader bars. The spreader bars may also include roof rack attachment plates 82 which are typically welded to the spreader bars. The attachment plates are drilled with a predetermined bolt pattern to allow for the easy "bolt on" attachment of a roof rack. When the attachment plates 82 are disposed adjacent the ends of the spreader bars as shown in FIG. 2, the spreader bars may be repositioned or flipped 180 degrees to provide alternate positions for the roof rack.

The frame 12 also includes a head rail 44, which is preferably of square cross-section and is preferably attached to the rail members 30 and 32 by bolts and angle fittings. The head rail conforms to and rests upon the top face of the pickup truck front panel 26. The head rail is preferably equipped with the front anchor fittings 33 which provide the front attachment points for the cover 14. The front anchor fittings may also be located on the longitudinal rails 30 and 32.

The preferred material for the structural members which comprise the frame 12, i.e., the rails 30 and 32, the hoops 34–38, the spreader bars 54, and the head rail 44, is either stainless steel or powder coated steel. However, there are many other suitable materials which include, but are not limited to, aluminum, titanium, and structural plastics.

Referring again to FIG. 1, a tailgate strip member 15 is shown. Similar to the longitudinal rail members 30 and 32, the strip is equipped with snaps 52 which serve to securely fasten the rear portion of the outer cover 14. As with the longitudinal rails, the snaps may be substituted with any other suitable attachment means such as hook and loop attachments. Other suitable substitutes for snaps are known in the art. The tail gate strip is designed to rest on and conform to the top or side surface of the tailgate 28. Preferably, the strip is formed from aluminum and is adhesively bonded to the tailgate. Other methods of attachment, such as fasteners are also suitable. In some situations, it may be preferable to weld or braze the tailgate strap to the tailgate, typically in these situations, the strap will be made from a compatible ferrous material.

Figure 7:
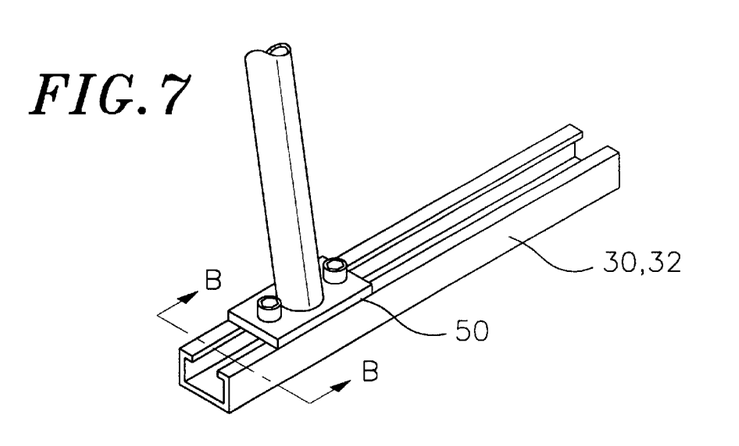
FIG. 7 is a perspective view of an alternate embodiment of a rail and friction joint suitable for use in the frame which comprises part of the present invention.
Figure 8:
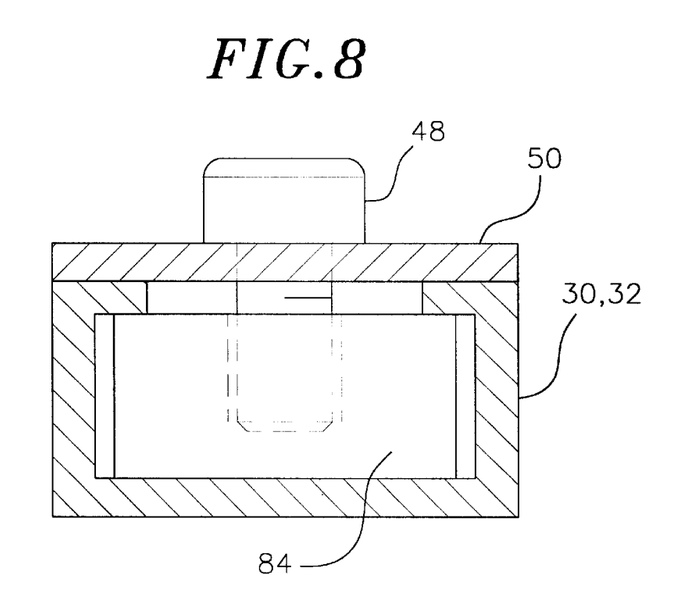
FIG. 8 is a section view, taken along the line b—b, of the frame rail shown in FIG. 7.

Referring to FIGS. 7 and 8, the longitudinal rails 30 and 32 may take an alternate form as shown. In this embodiment, the rails 30 and 32 are open in transverse cross section such that clamp blocks 84 may be slidably received within the rails. A slotted rectangular cross section is illustrated. With this type of rail, the hoop members 34–38 are attached to the rails by means of a plurality of bolts 48 which pass through holes in the hoop weldments 50, and through the slot in the rail, and thread into the clamp block. Tightening the bolts creates a friction joint that secures the hoop members to the rails. This arrangement allows the hoop members to be readily positioned at different locations along rail.

In the above description of the frame 12, preferred cross sectional shapes are given for each frame member. Those skilled in the art will understand that a wide range of tubing shapes, sizes, and thickness may be used to form the above described structural elements. Thus, the shapes of the preferred embodiment are meant to be exemplary only and are not meant to be limiting. In addition, in the preferred embodiment all of the attachments between the structural members are in the form of bolted joints. This form of attachment allows for relative ease of assembly and allows for disassembly of the frame structure. However, this description is also meant to exemplary and is not meant to be limiting. Other forms of mechanical fasteners, such as ball-lock pins may substituted for bolted joints. Further, where disassembly of the frame structure is not required, the structural members which comprise the frame may be permanently attached to each other by welding, brazing, bonding, or other suitable methods.

Figure 4:
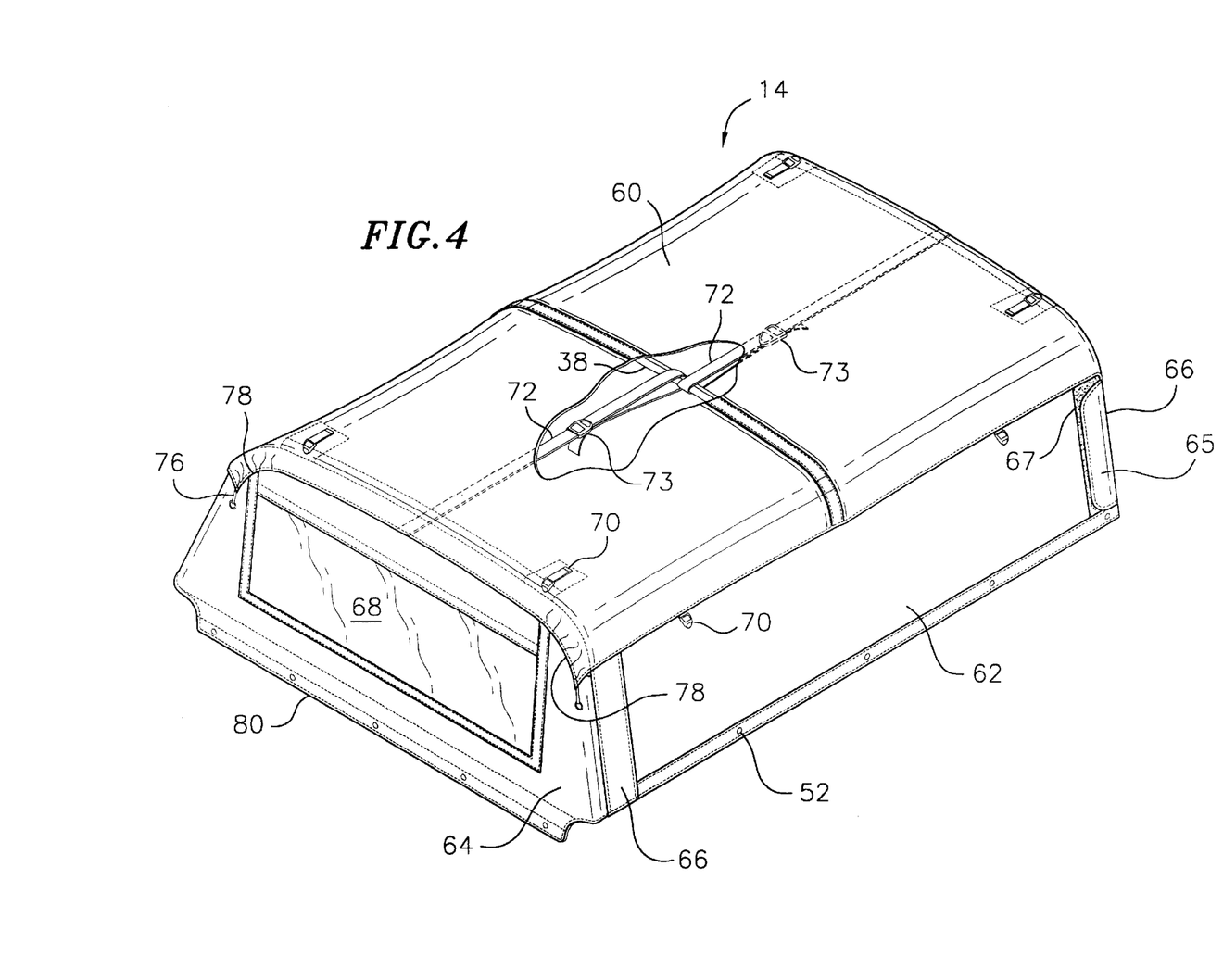
FIG. 4 is a perspective view of an outer covering, including a detail of a longitudinal tensioning strap, for a soft shell camper top in accordance with the present invention.
Figure 5:
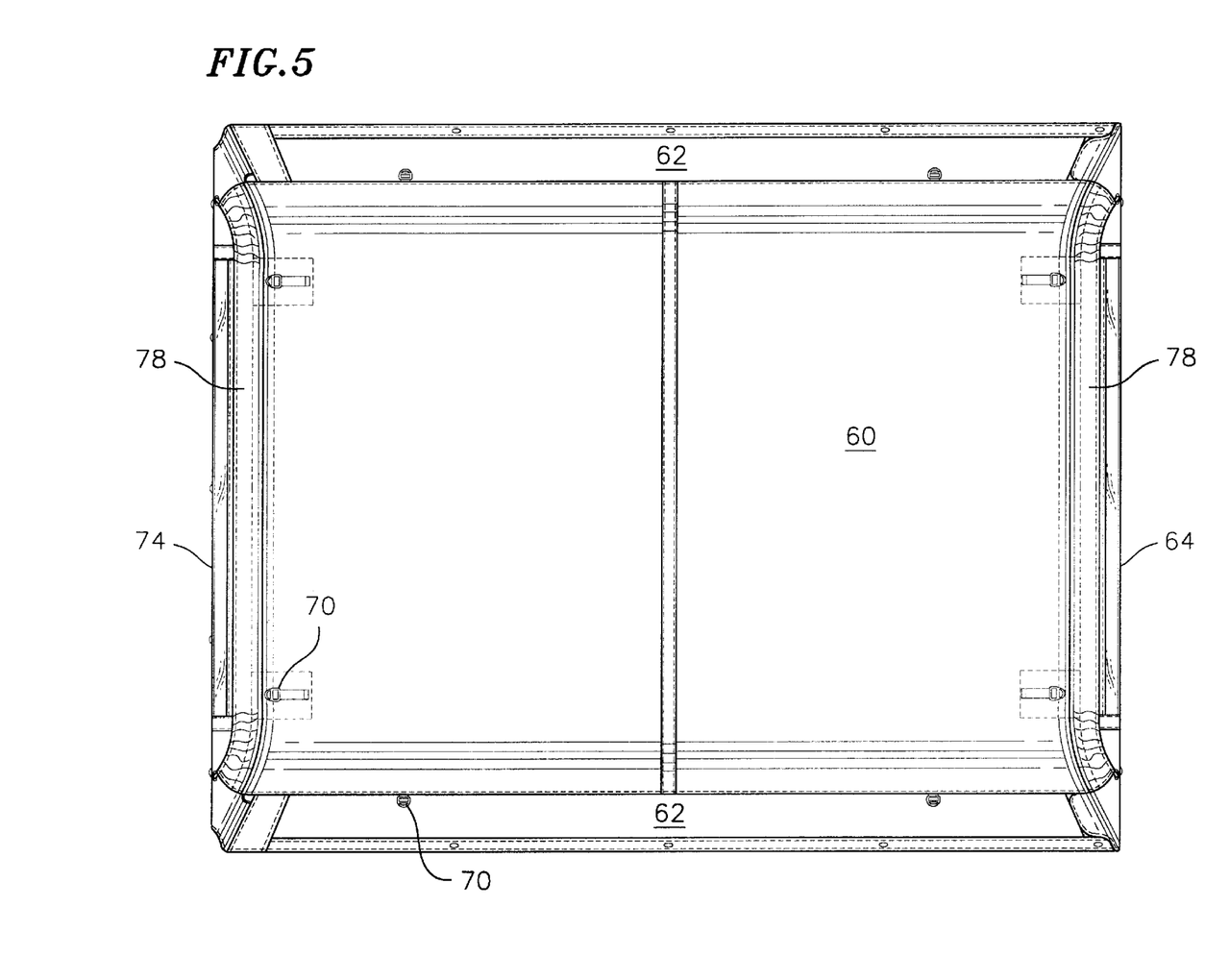
FIG. 5 is a top view of an outer covering for a soft shell camper top in accordance with the present invention.

Referring now to FIGS. 1, 4 and 5, the outer cover 14 of the present invention includes top panels 60, side panels 62, a rear panel 64 which typically includes a transparent window portion 68, and a front panel 74 (FIG. 5). Preferably, two top panels are used in short bed pickup truck applications and three top panels are used in long bed pickup truck applications. Each side, front, and rear panel has a first closed or "rolled down" position (FIG. 4) in which the panel is secured to a corresponding longitudinal rail 30 or 32, head rail 44, or tailgate strip member 15. Each panel also has a second open or "rolled up" position (FIG. 1) where the panel is secured to a corresponding spreader bar 54 in the case of the side panels, or to the front or rear hoop members, 34 or 36, in the case of the front and rear panels. Each panel may be rolled up or down independently of the other panels.

Referring now to FIG. 4, the outer cover is equipped at each corner between the side curtains and the front or rear curtain with a loop and hook fastener closure 66. Each closure 66 comprises a flap 65 which contains the loop portion. The flaps are typically sewn or formed into the front and rear panels. The closures 66 also include a hook or nap portion 67. The hook portion is typically sewn or formed into the side panels. Mating the loop and hook portions of the closure produces an easily resealable, yet strong, fabric joint. The closures function to seal the corners between the side panels and the front and rear panels from any dust, dirt, rain, or snow, which may be present due to inclement weather, off-road driving conditions, or other conditions.

With continuing reference to FIG. 4, the side panels 62 each include snaps 52, or other suitable fasteners, which mate with the snaps on the respective rail members 30 and 32. The front and rear panels 74 and 64 also include the snaps 52, or other suitable fasteners, which mate with the snaps on the head rail 44 and tailgate strip 15 respectively. The snaps serve to removably attach the panels to the corresponding frame members and thereby hold the panels in the first closed or "rolled down" position, as is shown in FIG. 4.

Referring now to FIGS. 1 and 4, the top panels 60 of the outer cover 14 include strap and buckle assemblies 70 which serve to hold the outer cover panels (side, front, and rear) in the rolled up position. The top panels 60 also includes continuous front and rear channels 78 sewn or formed into the top portion's front and rear edges. The channels provide a passage through which is threaded a tie-down cord 76. The tie-down cord in the front and rear channels is secured to the front and rear anchors 33 as is shown in FIG. 1. The channels, tie-down cord, and anchors provide secure means for snugging the outer cover 14 to the frame 12. The tie-down cord functions as a tensioning or biasing member creating a snug fit between the outer cover and the frame with only a modest "pulling" of the cord about the anchors.

Referring again to FIG. 4, the primary means of attaching the outer cover 14 to the frame 12, are a plurality of tensioning straps 72. The straps are sewn or formed into the front and rear edges of the upper panels 60 of the outer cover 14 and are disposed below the respective front and rear hoop members 34 and 36. The straps run longitudinally to an intermediate hoop member 38. By means of buckles 73, each strap may be pulled snug, the effect of which is to tension or stretch the portion of the top between the hoop members to which the straps are attached. This feature tends to reduce flapping of the outer cover when the vehicle is driven at freeway speeds (60–70 mph). Generally, three sets of tension straps are preferred. However, the number of straps is dependant on the size of the vehicle, i.e., full size trucks may require more straps and mini-pickups may require less. As used here, a set of straps refers to one strap running from under the rear hoop 36 to the intermediate hoop 38 and a second strap running from under the front hoop 34 to the intermediate hoop 38, where the straps are approximately co-linear and are disposed adjacent each other at the intermediate hoop, as is shown in FIG. 4.

The outer covering 14 may be constructed of any suitable weather resistant material. The preferred material is woven fabric made from an acrylic fiber which is coated with a water repellent material. Such a fabric is available from Glen Raven Mills, Inc., located in Glen Raven, N.C., and is sold under the trade name SUNBRELA. Other suitable materials include waterproofed canvas, nylon, and other polymer films and fabrics.

Figure 6:
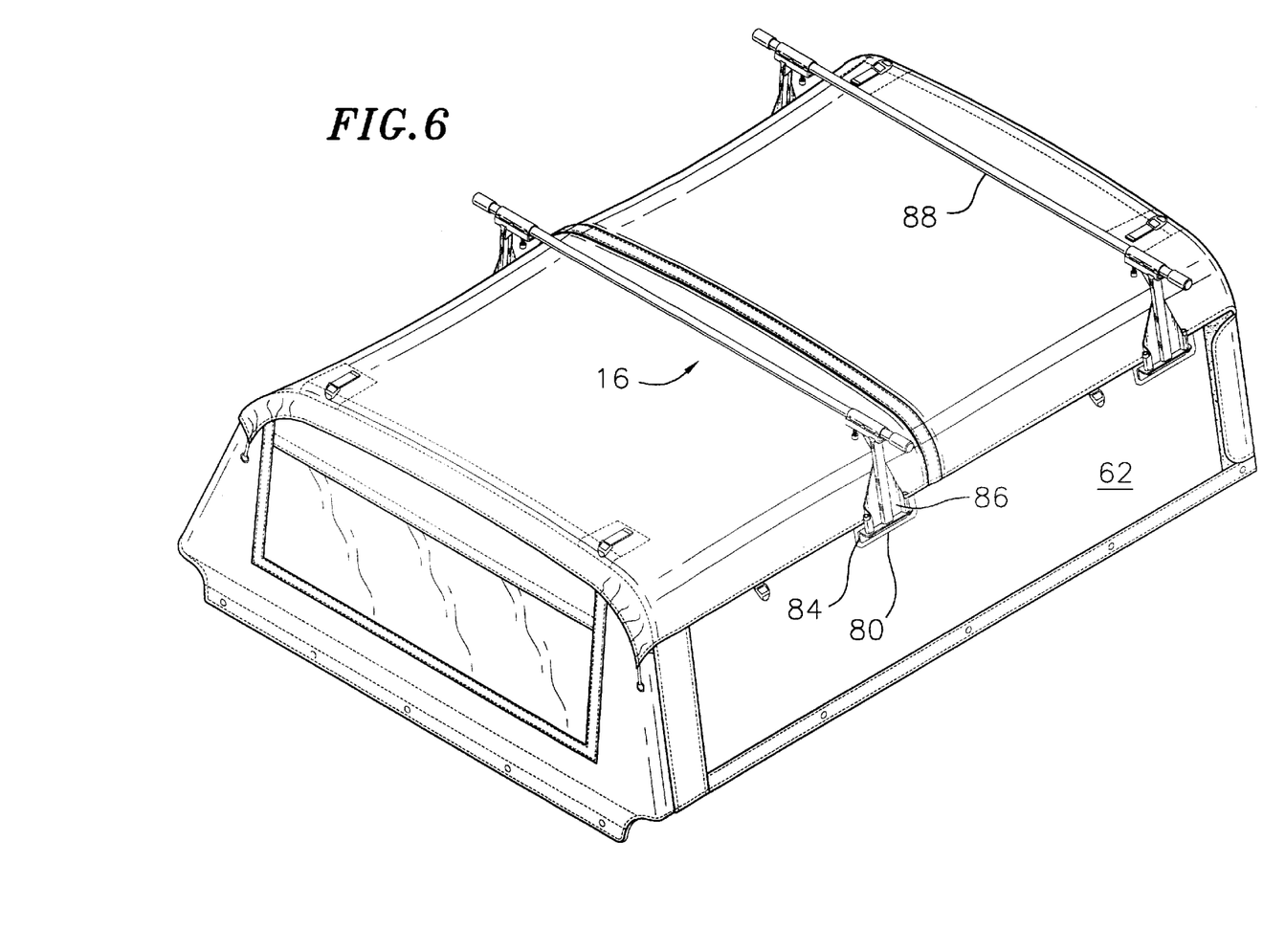
FIG. 6 is a perspective view of a soft shell camper top, showing details of a roof-rack attachment, in accordance with the present invention.

Referring now to FIGS. 1 and 6, there is illustrated a roof rack 16 which is designed specifically for use with the soft shell camper top 10 of the present invention. The roof rack comprises a plurality of uprights 86 and a plurality of crossbars 88. The uprights and cross bars are shown attached to the soft shell camper top. In the preferred embodiment, the uprights attach to the attachment fittings 82 (FIG. 2) by means of angle fittings 84. For ease of installation and removal, a bolted connection is preferred. FIG. 6 illustrates the cutouts 80 in the side curtains 62 which provide access to the attachment weldments 82.

Presently, there are also a variety of roof racks commercially available which may be adapted for use with the camper top of the present invention. Typically, these roof racks include an interface which attaches the rack to a vehicle by means of clamping to the vehicle's rain gutter or upper door jamb. There are yet other methods of attachment in use. Those skilled in the art will understand that the attachment weldments 82 may be modified to accommodate various roof rack attachment interfaces. Accordingly, it is not intended that the method of attachment or design of the attachment weldments 82 be limited to that disclosed in the preferred embodiment.

Shaped in the general manner described and illustrated herein, the soft shell camper top 10 of the present invention provides several advantages over the prior art. The camper top presents an aerodynamic profile permitting the truck to be driven comfortably at freeway speeds without introducing significant adverse aerodynamic reactions that could otherwise lead to instability of the vehicle or cause poor gas milage. The soft shell top of the present invention is of comparatively light weight in contrast to typical hard shell camper tops and therefore may be readily installed and removed from the vehicle as the needs or desires of the owner dictate. Another advantage of the soft shell top of the present invention is that the side curtains 62 and the front and rear curtains 64 and 74 may be rolled up to allow easy access to the cargo bed. It will also be appreciated that the new camper top may be installed by only one person using a few simple tools.

While only the presently preferred embodiment has been described in detail, as will be apparent to those skilled in the art, modifications and improvements may be made to the device disclosed herein without departing from the scope of the invention. Accordingly, it is not intended that the invention be limited except as by the appended claims.

What is claimed is:

1. A soft shell camper top for mounting on a pickup truck, the camper top comprising:
a frame comprising;
first and second elongate longitudinal rail members structured to rest on and conform generally to the faces of the side panels defining the truck bed, the rails extending longitudinally the length of the side panel faces, wherein the first rail is attachable to one of the truck side panel faces and the second rail is attachable to the opposing truck side panel face;
a one-piece front hoop member, having first and second ends, disposed adjacent to the pickup cab and laterally spanning the truck side panel faces, the first end being rigidly attached to the first rail member and the second end being rigidly attached to the opposing second rail member;
a one-piece rear hoop member, having first and second ends, disposed adjacent to the pickup tailgate and laterally spanning the truck side panel faces, the first end being rigidly attached to the first rail member and the second end being rigidly attached to the opposing second rail member;
at least one one-piece intermediate hoop member, having first and second ends, disposed intermediate the front and rear hoop members and laterally spanning the truck side panel faces, the first end being rigidly attached to the first rail member and the second end being rigidly attached to the opposing second rail member;
a plurality of elongate spreader bars disposed parallel to the rail members, interconnecting the hoop members;
an outer cover adapted to attach to, and securely fit over, the frame, the cover including a plurality of panels, wherein each panel has a first closed position which seals the camper top and a second open position which allows access through the camper top to the interior of the truck bed; and
a tailgate strip structured to attach to and conform to the top face of the truck tailgate, wherein the tailgate may be opened and closed without removal of the strip;
the tailgate strip including snap attachments for the outer cover.

2. The soft shell camper top of claim 1, wherein the rail members are removably attachable to the truck bed side panels.

3. The soft shell camper top of claim 1, wherein each longitudinal rail member is removably attachable to the truck bed side panels via two through-bolts on short bed pickup trucks and three through-bolts on long bed pickup trucks.

4. The soft shell camper top of claim 1, wherein the rail members are clamped to the top faces of the truck bed side panels.

5. The soft shell camper top of claim 1, wherein the rail members Include a plurality of attachments for connection to the outer cover.

6. The soft shell camper top of claim 5, wherein the attachments are tie-down anchors and snaps.

7. The soft shell camper top of claim 1, wherein the hoop members generally conform to the outline of the pickup truck cab.

8. The soft shell camper top of claim 1, wherein the one-piece hoop members include two mutually opposed generally inwardly sloping upright portions integrally formed with a generally horizontal port-on disposed therebetween.

9. The soft shell camper top of claim 8, wherein the hoop members generally conform to the outline of the pickup truck cab, the horizontal portion of the hoop members rising to a vertical height within a range of about one inch above or below the top of the truck cab, the inwardly sloping upright portions of the hoop members extending about one inch inwardly or outwardly from the generally vertical edges of the truck cab, whereby the profile of the camper top reduces buffeting of the top at freeway speeds.

10. The soft shell camper top of claim 1, wherein the one-piece hoop members are removably attachable to the rail members.

11. The soft shell camper top of claim 10, wherein the one-piece hoop members are bolted to the rail members.

12. The soft shell camper top of claim 1, wherein the spreader bars include provisions for attaching a roof rack.

13. The soft shell camper top of claim 1, wherein the spreader bars are removably attached to the one-piece hoop members.

14. The soft shell camper top of claim 13, wherein the spreader bars are bolted to the hoop members.

15. The soft shell camper top of claim 1, wherein the frame further includes a head rail which is structured to rest on, conform to, and be removably attachable to, the face of the front bed panel, and further wherein the head rail is optionally removably attachable at each end to the opposing longitudinal rail members.

16. The soft shell camper top of claim 15, wherein the head rail is bolted to the longitudinal rail members.

17. The soft shell camper top of claim 1, wherein the longitudinal rail members, hoop members, and spreader bars are made from a material selected from the group consisting of stainless steel, powder coated steel and aluminum.

18. The soft shell camper top of claim 1, wherein the outer cover includes front and rear panels, and left and right side panels, and further includes provisions for securing the side panels in a rolled up position.

19. The soft shell camper top of claim 18, wherein the panels include a plurality of attachments for securely fastening to the frame members in a closed position.

20. The soft shell camper top of claim 1, wherein the plurality of panels which forms the outer cover includes a rear panel, a front panel, and one side panel on each opposing longitudinal side, and further wherein the front and rear panels include loop and hook fastener closures at each corner which are sealable to the respective adjacent side panels which include mating loop and hook fastener surfaces.

21. The soft shell camper top of claim 1, wherein the outer cover includes a plurality of tensioning straps, each strap being attached to a front or rear edge of the cover and running under the front or rear hoop members and attaching to an intermediate hoop member, wherein the straps secure and tightly conform the cover to the frame.

22. The soft shell camper top of claim 21, wherein the cover further includes tensioning cords, the cords being disposed along the lower perimeter of the front and rear portions of the cover and being of sufficient length to be tied on anchors attached to the frame members.

23. The soft shell camper top of claim 1, wherein the rail members are open in transverse cross section such that at least one clamp block may be slidably received within the rails.

24. The rail members of claim 23, wherein the rail members have slotted rectangular cross sections.

25. A soft shell camper top for mounting on a pickup truck, the camper top comprising:
   a frame comprising;
      first and second elongate longitudinal rail members structured to rest on and conform generally to the faces of the side panels defining the truck bed, the rails extending longitudinally the length of the side panel faces, wherein the first rail is attachable to one of the truck side panel faces and the second rail is attachable to the opposing truck side panel face;
      a one-piece front hoop member, having first and second ends, disposed adjacent to the pickup cab and laterally spanning the truck side panel faces, the first end being rigidly attached to the first rail member and the second end being rigidly attached to the opposing second rail member;
      a one-piece rear hoop member, having first and second ends, disposed adjacent to the pickup tailgate and laterally spanning the truck side panel faces, the first end being rigidly attached to the first rail member and the second end being rigidly attached to the opposing second rail member;
      at least one one-piece intermediate hoop member, having first and second ends, disposed intermediate the front and rear hoop members and laterally spanning the truck side panel faces, the first end being rigidly attached to the first rail member and the second end being rigidly attached to the opposing second rail member;
      a plurality of elongate spreader bars disposed parallel to the rail members, interconnecting the hoop members;
      an outer cover adapted to attach to, and securely fit over, the frame, the cover including a plurality of panels, wherein each panel has a first closed position which seals the camper top and a second open position which allows access through the camper top to the interior of the truck bed; and
      a roof rack comprising four uprights and mating crossbars.

26. The soft shell camper top of claim 25 wherein the rail members are removably attachable to the truck bed side panels.

27. The soft shell camper top of claim 25 wherein each longitudinal rail member is removably attachable to the truck bed side panels via two through-bolts on short bed pickup trucks and three through-bolts on long bed pickup trucks.

28. The soft shell camper top of claim 25 wherein the rail members are clamped to the top faces of the truck bed side panels.

29. The soft shell camper top of claim 1, wherein the rail members include a plurality of attachments for connection to the outer cover.

30. The soft shell camper top of claim 28, wherein the attachments are tie-down anchors and snaps.

31. The soft shell camper top of claim 25, wherein the hoop members generally conform to the outline of the pickup truck cab.

32. The soft shell camper top of claim 25, wherein the hoop members include two mutually opposed generally inwardly sloping upright portions integrally formed with a generally horizontal portion disposed therebetween.

33. The soft shell camper top of claim 32, wherein the hoop members generally conform to the outline of the pickup truck cab, the horizontal portion of the hoop members rising to a vertical height within a range of about one inch above or below the top of the truck cab, the inwardly sloping upright portions of the hoop members extending about one inch inwardly or outwardly from the generally vertical edges of the truck cab, whereby the profile of the camper top reduces buffeting of the top at freeway speeds.

34. The soft shell camper top of claim 25, wherein the vertical portions of the hoop members may extend about one inch inwardly or outwardly from the generally vertical edges of the truck cab.

35. The soft shell camper top of claim 25, wherein the one-piece hoop members are removably attachable to the rail members.

36. The soft shell camper top of claim 35, wherein the one-piece hoop members are bolted to the rail members.

37. The soft shell camper top of claim 25, wherein the spreader bars include provisions for attaching a roof rack.

38. The soft shell camper top of claim 25, wherein the spreader bars are removably attached to the one-piece hoop members.

39. The soft shell camper top of claim 37, wherein the spreader bars are bolted to the hoop members.

40. The soft shell camper top of claim 25, wherein the frame further includes a head rail which is structured to rest on, conform to, and be removably attachable to the face of the front bed panel, and further wherein the head rail is optionally removably attachable at each end to the opposing longitudinal rail members.

41. The soft shell camper top of claim 39, wherein the cross rail is removably attached to the longitudinal rails.

42. The soft shell camper top of claim 39, wherein the head rail is bolted to the longitudinal rail members.

43. The soft shell camper top of claim 25, wherein the longitudinal rail members, hoop members, and spreader bars are made from a material selected from the group consisting of stainless steel, powder coated steel and aluminum.

44. The soft shell camper top of claim 25, wherein the outer cover includes front and rear panels, and left and right side panels and further includes provisions for securing the side panels in a rolled up position.

45. The soft shell camper top of claim 44, wherein the panels include a plurality of attachments for securely fastening to the frame members in a closed position.

46. The soft shell camper top of claim 45, wherein the plurality of panels which forms the outer cover includes a rear panel, a front panel, and one side panel on each opposing longitudinal side, and further wherein the front and rear panels include loop and hook fastener closures at each corner which are sealable to the respective adjacent side panels which include mating loop and hook fastener surfaces.

47. The soft shell camper top of claim 25, wherein the outer cover includes a plurality of tensioning straps, each strap being attached to a front or rear edge of the cover and running under the front or rear hoop members and attaching to an intermediate hoop member, wherein the straps secure and tightly conform the cover to the frame.

48. The soft shell camper top of claim 47, wherein the tensioning means includes a plurality of adjustable longitudinal straps wherein each strap is attached to a front or rear edge of the cover and runs under the front or rear hoop members and attaches to an intermediate hoop member.

49. The soft shell camper top of claim 48, wherein the cover further includes tensioning cords, the cords being disposed along the lower perimeter of the front and rear portions of the cover and being of sufficient length to be tied on anchors attached to the frame members.

50. The soft shell camper top of claim 25, wherein the rail members are open in transverse cross section such that at least one clamp block may be slidably received within the rails.

51. The rail members of claim 50, wherein the rail members have slotted rectangular cross sections.

* * * * *